No. 884,835. PATENTED APR. 14, 1908.
J. P. MEYER.
PHOTOMETER.
APPLICATION FILED MAY 31, 1907.
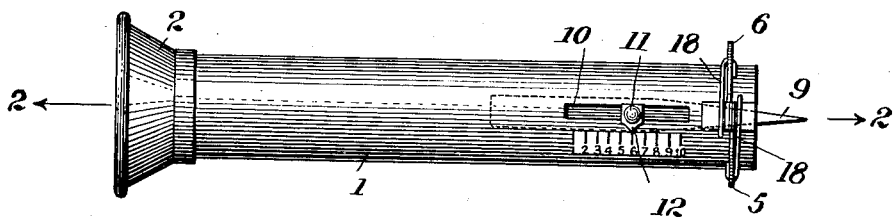
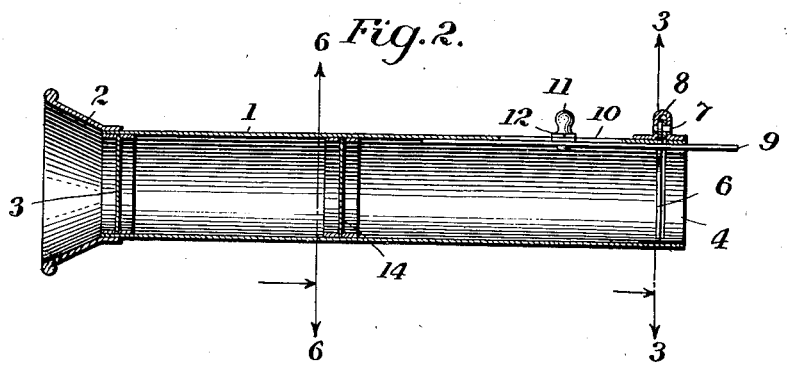
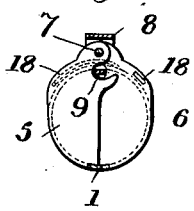 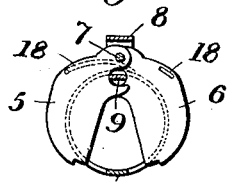 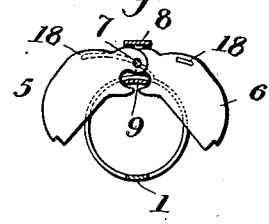
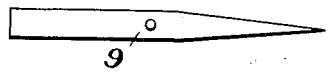
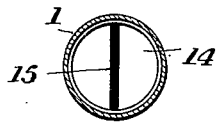
Witnesses
J. G. Strinkel
J. J. McCarthy
Inventor
Joseph P. Meyer
By Foster Freeman Watson & Coit
Attorneys

UNITED STATES PATENT OFFICE.

JOSEPH P. MEYER, OF ROCHESTER, NEW YORK.

PHOTOMETER.

No. 884,835.  Specification of Letters Patent.  Patented April 14, 1908.

Application filed May 31, 1907.  Serial No. 376,561.

To all whom it may concern:

Be it known that I, JOSEPH P. MEYER, a citizen of the United States, and resident of Rochester, Monroe county, State of New York, have invented certain new and useful Improvements in Photometers, of which the following is a specification.

This invention relates to a device for measuring light and determining automatically the proper length of time to expose a photographic plate or film.

As is well known to photographers, the light varies continuously in certain kinds of weather and in order to secure the best results it is necessary to know the intensity of the light at the moment of exposure.

According to my invention I measure the reflected light from the object to be photographed, and the time of exposure thus determined depends upon the nature of the object or scene as well as the intensity of the light to which it is exposed.

The nature of the invention will be more fully understood from the following detailed description in connection with the accompanying drawing, in which, Figure 1 is a plan view of a device embodying the invention; Fig. 2 is a longitudinal section on the line 2—2 of Fig. 1; Figs. 3, 4 and 5 are sections on the line 3—3 of Fig. 2 showing the valve or shutter in different positions; Fig. 6 is a section on the line 6—6 of Fig. 2; Fig. 7 is a detail of the shutter opening device.

Referring to the drawing, 1 indicates a metal tube and 2 any suitable eye piece. Within the tube near the eye piece or sighting end of the tube is a transversely arranged disk 3 of colored transparent material, such for instance, as ruby glass or celluloid. At or near the forward or light inlet end 4 of the tube there is a shutter adapted to shut out more or less of the light from the tube. This shutter as shown, consists of two plates 5, 6, pivoted at 7 to a bracket 8 which is carried on the outside of the tube. The springs 18 tend constantly to close the shutter, that is, to throw the plates 5, 6, into the position shown in Fig. 3. A wedge 9 arranged within the tube is adapted to be projected between the plates of the shutter to move them apart and admit more or less light to the tube. As shown, the wedge is in the form of a slide having a connection through a slot 10 with a handle or knob 11, by means of which the wedge may be moved. A pointer 12 connected with the knob 11 indicates on a scale 13 the degree of opening of the shutter or the proportion of light admitted by the shutter. The figures on the scale are preferably made to indicate the actual time which a plate should be exposed. As shown, the shutter is located slightly back from the forward end of the tube and the blades of the shutter work in transverse slits in the tube.

Between the shutter and the eye piece, and at some distance from the shutter, I place a transverse disk 14 of translucent or semi-opaque material, such as parchment or light brown paper or ground glass and on this disk I place an opaque mark 15, preferably a black diametrical line.

The operation of the device is as follows: The instrument should be directed to the object or scene to be photographed. If the shutter be open and the eye piece be placed to the eye so as to practically exclude light from that end of the tube, the dark line or mark 15 will be seen very distinctly excepting in very dark weather. If the line or mark appear faintly with the shutter wide open the exposure should be equal to the maximum indicated on the scale. If, however, the mark 15 is distinctly visible, the wedge should be withdrawn and the shutter permitted to close gradually until the mark is barely visible.

The device may be operated in the reverse manner by starting with the shutter closed and gradually opening it until the mark can be seen faintly. In either case when the mark is faintly visible the index 12 will indicate the proper exposure on the scale 15.

It will be understood that the device described is merely one embodiment of my invention and that various changes in the form and arrangement of the parts and in the materials used may be made within the spirit and scope thereof. For instance, the tube and eye piece may be of any suitable opaque material and the tube or casing may be of rectangular or other cross-section. The diaphragm at the eye piece may be glass, celluloid or other transparent material of any suitable color. The disk 14 may be of paper, celluloid, ground glass or other translucent or semi-opaque material through which a certain proportion of light can pass and the mark may be of different designs. The shutter and its operating device may also be varied as to the form and mode of operation, it being simply necessary to provide a shutter which can be operated to shut out the light from the tube to any desired extent. The scale is an arbitrary one and may be varied in different sized instruments and instruments used for different cameras or plates. The form of device illustrated in the drawing and described in detail herein has been found to work very satisfactorily.

While I prefer the construction illustrated I may in some instances combine the transparent colored diaphragm with the translucent diaphragm or omit the colored diaphragm and modify the translucent diaphragm accordingly.

Having described my invention what I claim and desire to secure by Letters-Patent is, 1. In a device for determining photographic exposures, the combination of a tube or casing, a transparent diaphragm at the sighting end thereof, a shutter at the light inlet end thereof, means for operating the shutter, and a translucent diaphragm intermediate the ends of the casing and having a mark thereon, for the purpose set forth.

2. In a device for determining photographic exposures, a tube or casing having a transparent colored diaphragm at its sighting end, a shutter, and an intermediate translucent diaphragm having an opaque mark thereon.

3. In a device for determining photographic exposures, a tube or casing having a transparent colored diaphragm, a shutter at its light inlet end, means for opening and closing the shutter to any desired extent, and a translucent diaphragm having an opaque mark between said transparent diaphragm and the shutter.

4. In a device for determining photographic exposures, a tube or casing having a transparent colored diaphragm at its sighting end, a shutter at its light inlet end, a translucent diaphragm intermediate the ends of the casing, and means for opening and closing the shutter, the said translucent diaphragm having an opaque mark thereon.

5. In a device for determining photographic exposures, a tube or casing having a transparent colored diaphragm at its sighting end, a shutter at the other end, a translucent diaphragm intermediate the ends of the casing, and means for opening and closing the shutter, the said translucent diaphragm having an opaque diametrical line thereon.

6. In a device for determining photographic exposures, the combination with a tube or casing, of a shutter arranged at the light inlet end thereof, a slidable wedge for opening the shutter, an index and scale for indicating the degree of opening of the shutter, a translucent diaphragm arranged in the rear of the shutter and a colored transparent diaphragm between said translucent diaphragm, and the sighting end of the tube or casing the said translucent diaphragm having an opaque mark thereon.

In testimony whereof I affix my signature in presence of two witnesses.

JOSEPH P. MEYER.

Witnesses:
J. A. WATSON,
ARTHUR L. BRYANT.